(12) United States Patent
Sweeney et al.

(10) Patent No.: US 6,805,728 B2
(45) Date of Patent: Oct. 19, 2004

(54) METHOD AND APPARATUS FOR THE ABATEMENT OF TOXIC GAS COMPONENTS FROM A SEMICONDUCTOR MANUFACTURING PROCESS EFFLUENT STREAM

(75) Inventors: Joseph D. Sweeney, Brookfield, CT (US); Paul J. Marganski, Ansonia, CT (US); W. Karl Olander, Indian Shores, FL (US); Luping Wang, Brookfield, CT (US)

(73) Assignee: Advanced Technology Materials, Inc., Danbury, CT (US)

( * ) Notice: Subject to any disclaimer, the term of this patent is extended or adjusted under 35 U.S.C. 154(b) by 0 days.

(21) Appl. No.: 10/314,727

(22) Filed: Dec. 9, 2002

(65) Prior Publication Data

US 2004/0107833 A1 Jun. 10, 2004

(51) Int. Cl.⁷ .......................... B01D 53/04; B01D 53/68
(52) U.S. Cl. ................ 95/133; 95/131; 96/132; 96/133; 96/135; 96/136; 96/142
(58) Field of Search .............. 95/116, 131–140; 96/108, 142, 131–136

(56) References Cited

U.S. PATENT DOCUMENTS

| | | | |
|---|---|---|---|
| 4,743,435 A | | 5/1988 | Kitahara et al. |
| 4,910,001 A | | 3/1990 | Kitahara et al. |
| 4,996,030 A | | 2/1991 | Kitahara et al. |
| 5,085,674 A | * | 2/1992 | Leavitt .......................... 95/98 |
| 5,098,880 A | * | 3/1992 | Gaffney et al. ............. 502/432 |
| 5,114,689 A | * | 5/1992 | Nagji et al. .................. 423/230 |
| 5,853,678 A | | 12/1998 | Sugimori et al. |
| 5,919,286 A | * | 7/1999 | Golden et al. .................. 95/98 |
| 5,993,766 A | * | 11/1999 | Tom et al. .................... 423/294 |
| 6,007,706 A | * | 12/1999 | Carnell et al. .............. 208/303 |
| 6,238,460 B1 | * | 5/2001 | Deng et al. ..................... 95/98 |
| 6,338,312 B2 | * | 1/2002 | Hayes et al. .......... 118/723 CB |
| 6,402,813 B2 | * | 6/2002 | Monereau et al. ............. 95/96 |
| 6,432,171 B1 | * | 8/2002 | Kumar et al. ................. 95/120 |
| 6,537,353 B2 | * | 3/2003 | Holst et al. ................... 96/108 |
| 6,540,814 B2 | * | 4/2003 | Hayes et al. .................. 95/116 |

FOREIGN PATENT DOCUMENTS

| | | |
|---|---|---|
| EP | 1205564 A2 | 5/2002 |
| JP | 62286520 A2 | 12/1987 |
| JP | 1996059391 A | 3/1996 |

* cited by examiner

Primary Examiner—Robert H. Spitzer
(74) Attorney, Agent, or Firm—Margaret Chappuis (57) ABSTRACT

An apparatus and process for abating at least one acid or hydride gas component or by-product thereof, from an effluent stream deriving from a semiconductor manufacturing process, comprising, a first sorbent bed material having a high capacity sorbent affinity for the acid or hydride gas component, a second and discreet sorbent bed material having a high capture rate sorbent affinity for the same gas component, and a flow path joining the process in gas flow communication with the sorbent bed materials such that effluent is flowed through the sorbent beds, to reduce the acid or hydride gas component. The first sorbent bed material preferably comprises basic copper carbonate and the second sorbent bed preferably comprises at least one of, $CuO$, $AgO$, $CoO$, $Co_3O_4$, $ZnO$, $MnO_2$ and mixtures thereof.

44 Claims, 4 Drawing Sheets

METHOD AND APPARATUS FOR THE ABATEMENT OF TOXIC GAS COMPONENTS FROM A SEMICONDUCTOR MANUFACTURING PROCESS EFFLUENT STREAM

BACKGROUND

1. Field of the Invention

The present invention relates to a method and apparatus for removing toxic gas components exhausted from a semiconductor process using same.

2. Description of the Related Art

In the manufacture of semiconductors, the toxic, flammable, and corrosive nature of hydride and acid gases pose considerable health and environmental hazards in addition to jeopardizing the integrity of exhaust systems.

Material gases, such as $BF_3$, $AsH_3$ and $PH_3$ are used as primary dopant gases in ion implantation processes. Other gases, such as $SiF_4$, $GeF_4$, $(hfac)In(CH_3)_2$ and $Br_2Sb(CH_3)$ etc. are also used.

In the case of MOVPE/PECVD gases such as $SiH_4$, $SiF_4$, $NH_3$, $AsH_3$ and $PH_3$ are delivered to a process chamber through electrically isolated assemblies. $AsH_3$ or $PH_3$ are flowed at particularly high rates during deposition to provide atomic As or P of GaAs or GaP, respectively. HCl can be flowed over Ga metal in order to provide GaCl as a precursor to the atomic Ga of GaN. Epitaxial dielectric is deposited from $SiH_4$.

HCl and HF can be used for chamber cleans by creating radicals in a plasma stream, which flow to areas in the chamber where excess film accumulates. The radicals react with the deposited film to create gaseous by-products. The by-products are then removed from the chamber and pumped out as effluent.

Ongoing research focused on reducing emission levels of such toxic gases from the effluent waste streams of semiconductor manufacturing processes, involves the optimization of abatement processes. Current processes include a variety of thermal, wet and/or dry scrubbing operations.

Thermal scrubbers react an oxidizing agent (almost always air) with a target component (e.g. $AsH_3$, $PH_3$, etc.) in a process effluent stream to produce an oxidized species of the target component (e.g. $As_2O_3$, $P_2O_5$, etc.). The oxidized species is then removed from the effluent stream by contacting the stream with a gas absorption column (water scrubber). The disadvantages of such a system are (a) it is energy intensive in that it requires significant amounts of electricity and/or fuel, such as $H_2$ or $CH_4$, (b) it requires water, and (c) it produces an aqueous hazardous waste stream when it scrubs arsenic containing compounds.

Wet scrubbing of effluent streams involves contacting the effluent gas from a specific process with a scrubbing liquid to cause undesired effluent stream components to be absorbed by the liquid, or to react with the liquid (e.g., a caustic solution for contacting with an acid gas effluent) to effect the removal of the undesired components from the gas phase. Often the scrubbing liquid includes an oxidizing agent such as potassium permanganate, a regulated substance, or sodium hypochlorite, which leads to unwanted precipitation reactions. Further, the wet scrubbing system requires the consumption of significant amounts of the oxidizing agents and leads to a contaminated aqueous waste stream.

Dry scrubbing involves contacting the effluent gas with a solid material which functions to chemisorb or react with the undesired components to effect their removal. Dry scrubbing concentrates and fully contains hazardous abated components, is passive in operation, has no moving parts and works on demand, making it the safest and most preferable mode of abatement operation.

With respect to ion implant processes it is expected that fluorinated acid gases will pass through an ion implant system largely intact, while hydride source gases will pass through only moderately intact. Thus, the large flow-rates of intact acid gas components and the high toxicity and low levels of permissible personnel exposure of hydride gas components (for example, the threshold limit value (TLV) for $AsH_3$ is 0.05 ppm, or a IDLH of 3 ppm) mandate highly efficient effluent stream treatment and/or abatement for removal of both gas types.

In addition to the foregoing issues incident to the use and operation of ion implantation systems, empirical characterization of ion implant process exhaust streams reveal significant emissions of hazardous gases in the process system from source gas pumps, roughing pumps and from cryogenic pump regeneration cycles.

It is important to note that for dry scrubbing purposes, the chemical requirements to scrub acid gases such as $BF_3$ and $SiF_4$ are entirely different than the chemical requirements to scrub hydride gases such as $AsH_3$, $PH_3$ and $GeH_4$.

With respect to chemical vapor deposition (CVD) processes, an acid gas and/or hydride gas may be used in combination with large amounts of a ballast or process gas, (e.g. hydrogen). Dry scrubbing of effluent streams deriving from such a process is difficult because a secondary reaction, typically reductive hydrogenation may occur between the scrubbing material and hydrogen at a temperature around 110° C. to 120° C. The secondary reaction, once initiated, may lead to a "runaway" situation, where temperatures in the scrubbing material reach 600° C.

Cupric oxide CuO, cupric hydroxide $Cu(OH)_2$, and copper carbonate $CuCO_3$, based materials are used in resin scrubbing materials for abatement of hydride compounds from semiconductor effluent streams. Although most copper based resins react exothermically with hydrides, CuO and $Cu(OH)_2$, materials can exotherm severely at temperatures between 110° C. to 120° C. in the presence of large quantities of hydrogen.

For example, U.S. Pat. Nos. 4,743,435, 4,910,001 and 4,996,030 disclose methods for removing hydride gas species from MOCVD applications using CuO based resins. However, the capacity of CuO based materials is limited due to the copper surface area and when attempts are made to increase CuO content, most notably by addition of CuO to a metal oxide mixture used to create the resin, the surface area can drop inordinately. Additionally, the material can exotherm severely due to the heats of adsorption and reaction of the hydride gas and since most CVD applications use large amounts of $H_2$ as carrier gas with $AsH_3$ and $PH_3$, temperature of the CuO material is critical, as exceeding a temperature of approximately 110° C. to 120° C. may result in the reduction of the CuO material by $H_2$, thereby creating severe exotherms that can exceed 500° C. to 600° C.

U.S. Pat. No. 5,853,678 discloses a method of removing harmful, volatile, inorganic hydrides, inorganic halides and organometallic compounds by contacting the harmful compound with crystalline cupric hydroxide. However, similar to CuO based materials, crystalline cupric hydroxide, $Cu(OH)_2$, based materials react with hydride gases to undergo $H_2$ reduction reactions in approximately the same temperature regime as CuO.

Japanese publication JP1996059391A discloses a method of removing Group V species from effluents containing same by contacting the Group V species with basic copper carbonate $CuCO_3.Cu(OH)_2$. Basic copper carbonate undergoes $H_2$ reduction reactions at temperatures higher than both CuO and $Cu(OH)_2$.

It would therefore be a significant advance in the art, and accordingly is an object of the present invention, to provide an abatement system capable of handling acid, hydride and/or metalorganic gases, which eliminates or at least ameliorates the aforementioned hazards of conventional CuO and $Cu(OH)_2$ processes.

It is another object of the invention to provide an improved system for the treatment of effluent streams comprising acid, hydride and/or metalorganic gaseous components having a potential operating temperature regime that is greater than 100° C.

It is another object of the instant invention to provide a safe, low-cost, high capacity, high efficiency system for the treatment of effluent streams comprising acid, hydride, and/or metalorganic gaseous components.

Other objects and advantages will be more fully apparent from the ensuing disclosure and appended claims.

SUMMARY

In one aspect, the present invention relates to an apparatus for abatement of at least one toxic gas component or by-product thereof, from an effluent stream deriving from a semiconductor manufacturing process, such apparatus comprising:

a first sorbent bed material having a high capacity sorbent affinity for said at least one toxic gas component;

a second and discreet sorbent bed material having a high capture rate sorbent affinity for said at least one toxic gas component; and a flow path joining the process in gas flow communication with the sorbent bed materials such that the effluent stream contacts the first sorbent bed material then the second sorbent bed material to at least partially remove the at least one toxic gas component from the effluent stream.

In one aspect, the present invention relates to an apparatus for abatement of at least one acid gas, hydride gas or by-product thereof, from an effluent stream deriving from a semiconductor manufacturing process, such apparatus comprising:

a first sorbent bed material having a high capacity sorbent affinity for said at least one acid gas, hydride gas or by-product thereof;

a second and discreet sorbent bed material having a high capture rate sorbent affinity for said at least one acid gas, hydride gas or by-product thereof; and a flow path joining the process in gas flow communication with the sorbent bed materials such that the effluent stream contacts the first sorbent bed material then the second sorbent bed material to at least partially remove the at least one acid gas, hydride gas or by-product thereof from the effluent stream.

In a further aspect, the present invention relates to a layered dry resin sorbent system for abatement of an acid gas or hydride gas or by-product thereof, comprising:

a first sorbent bed material having a high capacity sorbent affinity for said at least one acid or hydride gas component;

a second and discreet sorbent bed material having a high capture rate sorbent affinity for said at least one acid or hydride gas component; and a flow path joining the process in gas flow communication with the sorbent bed materials such that the effluent stream contacts the first sorbent bed material then the second sorbent bed material to at least partially remove the at least one acid gas, hydride gas or by-product thereof from the effluent stream.

In a still further aspect, the present invention relates to a process for reducing the concentration of at least one toxic gas component from a semiconductor process effluent stream containing same, said method comprising:

contacting said semiconductor process effluent with a first sorbent layer composition so as to retain at least a portion of the toxic gas component therein; and contacting said process effluent with a second layer sorbent composition, so as to retain a second portion of the toxic gas component therein, wherein said first sorbent layer comprises a material having a high sorptive capacity for said toxic component and said second sorbent layer material comprises a material having a high capture rate sorptive affinity for the toxic component.

Other aspects and features of the invention will be more fully apparent from the ensuing disclosure and appended claims.

DETAILED DESCRIPTION

The present invention relates to an apparatus and method for the abatement of toxic gas components present in an effluent gas stream deriving from a semiconductor manufacturing process. More particularly the present invention relates to an apparatus and method for the abatement of at least one acid or hydride gas component or by-product thereof present in an effluent gas stream from a Group III-V semiconductor manufacturing process.

The present invention further relates to an apparatus and method for the abatement of hydride and acid gas components present in an effluent gas stream deriving from a semiconductor manufacturing process, where extremely high abatement efficiencies are required.

The inventors of the instant invention have discovered that the efficiency of a particular sorbent based abatement system, may be increased by two to four fold, by placing a layer of a polishing resin (high capture rate) over a layer of a main bed (high capacity) sorbent material.

In one embodiment, the present invention relates to an apparatus for abatement of at least one toxic gas component or by-product thereof, from an effluent stream deriving from a semiconductor manufacturing process, such apparatus comprising:

a first sorbent bed material having a high capacity sorbent affinity for said at least one toxic gas component;

a second and discreet sorbent bed material having a high capture rate sorbent affinity for said at least one toxic gas component; and a flow path joining the process in gas flow communication with the sorbent bed materials such that the effluent stream contacts the first sorbent bed material then the second sorbent bed material to at least partially remove the at least one toxic gas component from the effluent stream.

In a preferred embodiment, the semiconductor manufacturing process is a Group III-V process and the effluent gas stream comprises at least one acid or hydride gas component or byproduct thereof, which contacts the first sorbent bed prior to contacting the second sorbent bed.

Semiconductor manufacturing processes frequently employing acid, hydride and/or metalorganic gaseous components include ion implant, metalorganic chemical vapor deposition (MOCVD) and plasma enhanced chemical vapor deposition (PECVD). Typical acid, hydride and/or metalorganic components and process by-products, which are consumed and usefully abated in such processes, include but are not limited to, $AsH_3$, $PH_3$, $SbH_3$, $BiH_3$, $GeH_4$, $SiH_4$, $NH_3$, HF, HCl, HBr, $Cl_2$, $F_2$, $Br_2$, $BCl_3$, $BF_3$, $AsCl_3$, $PCl_3$, $PF_3$, $GeF_4$, $AsF_5$, $WF_6$, $SiF_4$, $SiBr_4$, $COF_2$, $OF_2$, $SO_2$, $SO_2F_2$, $SOF_2$, WOF4, ClF3 $(hfac)In(CH_3)_2$ $H_2As(t-butyl)$, $H_2P(t-butyl)$, and $Br_2Sb(CH_3)$. Other usefully abated components include chlorosilanes such as $SiHCl_3$, and $SiH_2Cl_2$.

In one embodiment, the apparatus of the present invention comprises a layered dry resin sorbent system for abatement of at least one acid gas component, hydride gas component or by-product thereof, from a Group III-V semiconductor process of a semiconductor manufacturing facility, comprising:

a first sorbent bed material having a high capacity sorbent affinity for said at least one acid gas, hydride gas or by-product component;

a second and discreet sorbent bed material having a high capture rate sorbent affinity for said at; and a flow path joining the process in gas flow communication with the sorbent bed materials such that effluent is flowed through the sorbent beds, to at least partially remove said at least one acid, hydride, or byproduct component from the effluent.

The layered sorbent system of the instant invention comprises at least discrete, first and second sorbent layers having different mass transfer zones (MTZ). Typically, the first sorbent "slow" layer has a MTZ that is greater than the "fast" second sorbent layer as well as a higher intrinsic or theoretical capacity.

The sorbent material of the instant invention may comprise a physisorbent and/or a chemisorbent, as desired to effect desired abatement of effluent species.

The following definitions are provided for terms used herein:

"layer" is defined as a tabular body of sorbent articles, lying parallel to a supporting surface and distinctly limited above and below.

"TLV" is defined as the threshold limit value of a particular species and reflects the level of exposure to the particular species that a typical person can experience without an unreasonable risk of disease or injury.

"TLV sorbent capacity" is defined as the moles of gaseous component retained by a sorbent material per liter of sorbent material, when the breakthrough concentration reaches the species' TLV value;

"mass transfer zone" (MTZ) is defined as the length of sorbent layer required in order to remove a target contaminant (hydride gas, acid gas and/or byproduct thereof) from its incoming concentration level to a level defined as the breakthrough level (i.e. the concentration level at which a sorbent bed requires change-out, commonly chosen as the TLV of a particular species);

"slow" is defined as having a MTZ thickness that is between 25 and 100% of the total thickness of the first sorbent layer; and "fast" is defined as having a MTZ thickness that is less than the MTZ thickness of the "slow" sorbent layer.

For the "fast" sorbent layer to have a shorter MTZ, the "fast" sorbent layer material must have a "capture rate" for a particular target species that is higher than that of the "slow" layer material. The capture rate is the sum of all rates (e.g. characteristic mass transfer rate, gas adsorption rate, and chemical reaction rate of the target species with the sorbent material).

The MTZ thickness of the "slow" sorbent bed layer is intrinsically thicker than the MTZ of the "fast" sorbent bed layer. The thickness of the MTZ for the first sorbent bed layer is preferably between 10 and 100% of the total thickness of the first bed. More preferably, the thickness of the MTZ of the first sorbent bed layer is between 25 and 75% of the total thickness of the first bed. Most preferably, the thickness of the MTZ of the first sorbent bed is about 50% of the total thickness of the first bed. Under certain steady state conditions the thickness of the MTZ of the "slow" sorbent layer may be greater than 100% of the bed thickness, as the thickness of the MTZ will grow with time. The long MTZ advantageously helps to diffuse heat evolution, which occurs from the chemical reaction between the sorbent material and target species.

Layering of the sorbent materials involves the arrangement of placing layers of at least one "slower" high capacity resin material upstream of at least one layer of a "faster" high capture rate resin material. The "slower", high capacity resin materials typically require longer mass transfer zones (MTZ). Conversely, the "faster" high capture rate resin materials often have a lower sorbent capacity for the target gas, but have high capture rates (shorter MTZ).

Figure 1A:
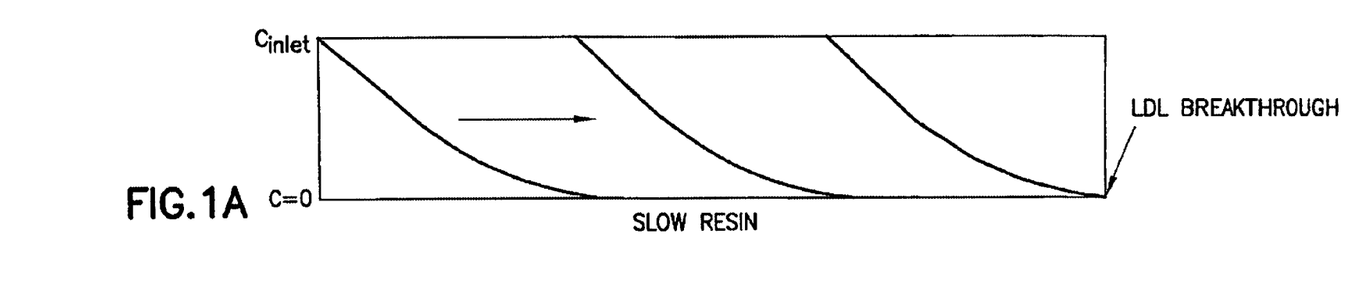
FIGS. 1A through 1C show a comparison of different sorbent configurations useful in the instant invention.
Figure 1B:
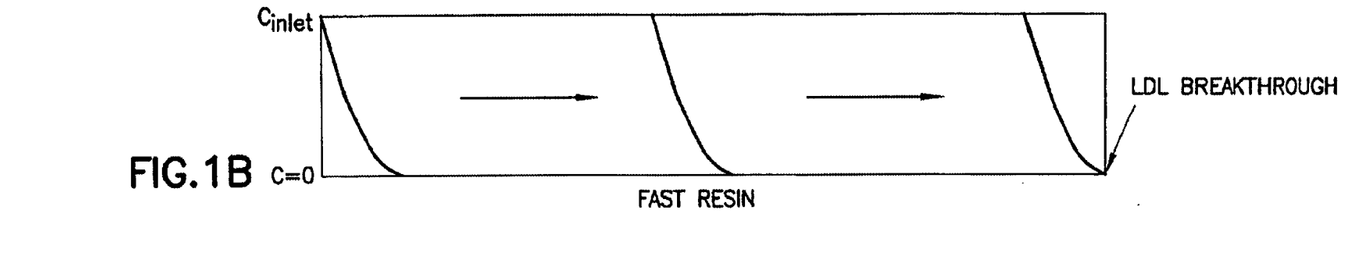
Figure 1C:
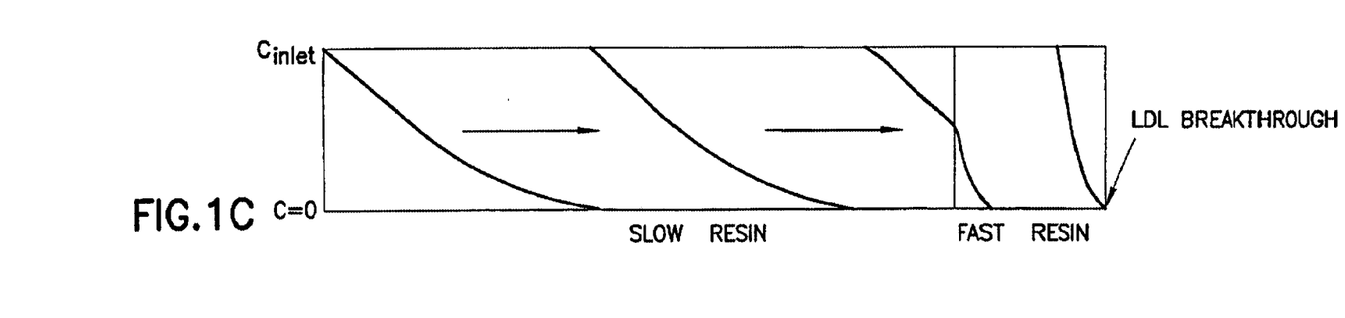

FIGS. 1A through 1C show a comparison of different sorbent configurations useful in the instant invention. The threshold limit value (TLV) breakthrough for a "slower" high capacity sorbent material occurs before much of the sorbent material is consumed (FIG. 1A). By layering a "faster" high capture rate sorbent material (FIG. 1B), downstream of a "slower" resin material (FIG. 1C), the TLV is shortened and a higher percentage of the "slower" resin material is consumed while achieving high abatement efficiencies.

For the capacity of the "slow" sorbent bed layer to be higher than the capacity of the "fast" sorbent bed layer the first sorbent bed material preferably comprises between 20 to 100 wt % active ingredient.

Preferably, the "slow" sorbent layer comprises a material having a surface area that is less than the surface area of the "fast" sorbent material, making the "slow" sorbent material slower to react with a contaminant species. The surface area of the "slow" sorbent material may range from about 5.0 to 300.0 $m^2/g$). Lower surface areas, and slower capture rates increase the MTZ, which advantageously aids in dispersing heats of reactions.

The MTZ thickness of the "fast" sorbent layer must be less than or equal to the thickness of the MTZ of the "slow" sorbent layer. Such a requirement results in a system having an overall increased capacity. In one embodiment, the MTZ length of the "fast" sorbent layer is less than or equal to 90% of the MTZ thickness of the "slow" sorbent layer, more preferably less than or equal to 50% of the MTZ thickness of the "slow" sorbent layer and most preferably less than or equal to 10% of the MTZ thickness of the "slow" sorbent layer.

The "fast" sorbent material may comprise a single composition or mixture of discreet components. In one embodiment, the "fast" sorbent material comprises a base adsorbent such as carbon, alumina, silica, diatomaceous earth or zeolite having a high surface area (e.g. between 100 to 1000 m$^2$/g) and an active ingredient impregnated into or coated onto a base adsorbent. The amount of active ingredient preferably comprises from about 0.1 to 100% by weight, more preferably between 0.5 and 50% by weight and most preferably between about 1 and 15% by weight of the total weight of the "fast" sorbent material.

The ratio of the percents of "faster" to "slower" sorbent materials useful in the present invention is dependent on the chemical and physical properties of the materials such as surface area, porosity, particles shape, particle size, etc., and may be readily determined by one of ordinary skill in the art. In one embodiment the system of the instant invention comprises a volumetric ratio of "fast" sorbent layer to "slow" sorbent layer of from about 1:20 to 1:1.

The first and second layers may comprise sorbent articles of any suitable composition, size, shape and conformation appropriate to the end use application and the specific effluent gas mixture involved in the Group III-V semiconductor process. The sorbent articles may comprise active ingredients and inactive ingredients, and may be in a finely divided form, e.g., beads, spheres, rings, toroidal shapes, irregular shapes, rods, cylinders, flakes, films, cubes, polygonal geometric shapes, sheets, fibers, coils, helices, meshes, sintered porous masses, granules, pellets, tablets, powders, particulates, extrudates, cloth or web form materials, honeycomb matrix monolith, composites (of the sorbent article with other components), or comminuted or crushed forms of the foregoing conformations.

In one embodiment, the "slow" and "fast" sorbent layers comprise particulates having a size range of from about 0.1 mm to 1.5 cm. Preferably, the "slow" sorbent layer comprises particulates having a size range of from about 1.0 mm to 15 mm, more preferably from about 0.8 mm to 7.5 mm, and most preferably from about 1.5 mm to 5.0 mm and preferably the "fast" sorbent layer comprises particulates having a size range of from about 0.1 mm to 7.5 mm, more preferably from about 0.5 mm to 5.0 mm and most preferably from about 0.5 mm to 4.0 mm.

The first and second sorbent layers may be housed in a single containment system or separate containment systems. Preferably, the sorbent layers are housed in a single containment system and the effluent stream comprising acid and/or hydride gas components, contacts the first sorbent layer material prior to contacting the second sorbent layer material.

In one embodiment, the first and second sorbent layers are housed in separate containers and one or more containers comprising at least a first "slow" sorbent layer are coupled to a single container or polisher comprising at least one "fast" sorbent layer. The containers comprising "slow" sorbent, may comprise same or similar sorbents capable of scrubbing same or differing toxic components from an effluent process stream. Further, the containers comprising "slow" sorbent, may serve the same or different tools. When the dual "slow" containers are plumbed to the same process tool, auto-switching capabilities between canisters exists. The polisher may further serve as a back up abatement system for a main abatement apparatus as described herein.

Figure 2:
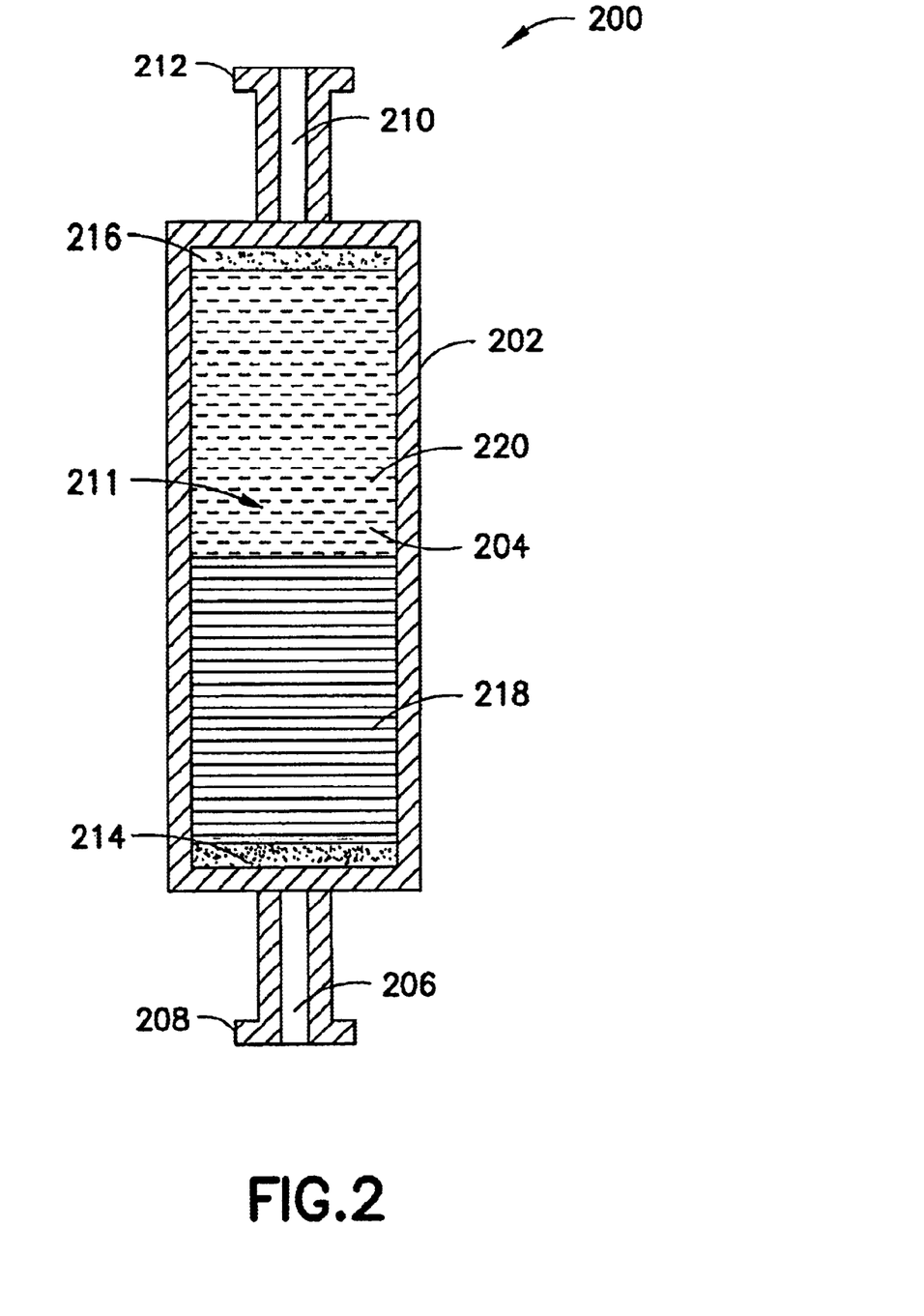
FIG. 2 is a schematic representation of a sorbent canister unit in accordance with one embodiment of the present invention.

FIG. 2 is a schematic representation of a sorbent canister unit 200 such as may be employed for the treatment of Group III-V effluent gases in accordance with one embodiment of the present invention.

The sorbent canister unit 200 includes a vessel 202 enclosing an interior vessel volume 204 communicating with the waste gas stream feed passage 206 in inlet 208, and communicating with the scrubbed gas discharge passage 210 in outlet 212. At the respective inlet and outlet ends of the vessel 202 are provided screen or grid members 214 and 216, respectively. Those foraminous members serve to contain the bed 211 or sorbent media in the vessel's interior volume, so that solids attrition does not occur in use of the system as waste gas is flowed from the inlet 205 to outlet 212 of the vessel through the bed of sorbent media therein.

The bed 211 of sorbent media may comprise a plurality of discrete zones or layers of different sorbent materials 218 and 220. The sorbent materials 218 and 220 may further comprise different material compositions, which are blended to provide a uniform mixture or monolith of same.

Thus, different sorbent materials are preferably employed, in discrete bed zones or layers wherein such layers may comprise sorbent materials, having different physical affinities for a particular waste gas species. For example, one such material layer 218 may comprise a high capacity sorbent selective for acid gas components of the effluent gas stream from a process such as ion implantation mid/or PECVD, and a second layer 220, may comprise a high capture rate sorbent, also selective for acid gas components in the effluent gas stream.

Further, each layer may comprise a blended mixture of sorbent materials, in which the respective materials are selective for removal of different waste gas species. For example, one such sorbent material may be highly selective for acid gas components of the effluent gas stream, and another sorbent material may be highly selective for hydride gas species in the effluent gas stream.

In a preferred compositional embodiment of the present invention, novel scrubbing compositions are employed to provide for concurrent removal of acid gas and hydride gas components in an effluent gas stream.

The present invention is based on the discovery that when two sorbent materials, having specified capacities and capture rates for sorption of a particular gaseous species, are arranged in a system in such a way as to allow for first contact of the gaseous species with a high capacity "slow" sorbent material followed by contact of the gaseous species with a high capture rate "fast" sorbent material, the efficiency for the abatement of the particular gaseous species in the system will increase as a result of synergy between the two materials.

The high capacity "slow" sorbent materials useful in the present invention, preferably comprise an oxidized form of copper and include but are not limited to copper hydroxide, $Cu(OH_2)$; copper oxide, CuO; copper carbonate, $CuCO_3$, basic copper carbonate, $CuCO_3.Cu(OH)_2$, and combinations thereof. Preferably the high capacity "slow" sorbent material comprises $CuCO_3.Cu(OH)_2$.

CuCO3 based sorbents resist $H_2$ reduction reaction up to temperatures in excess of 180° C. Whereas, CuO and $Cu(OH)_2$ initiate $H_2$ reduction reactions at temperatures of from about 110° C. to 120° C. respectively. Since most PECVD and MOCVD processes (e.g. doped polysilicon and silicon germane) use excessive amounts of $H_2$ ballast gas for deposition of Group V materials, it is preferable to use a $CuCO_3$ based sorbent in the associated abatement system. As such, the present invention is useful in thermally managing an abatement system where $H_2$ and a contaminant species are present in a process effluent stream by employing a first sorbent layer able to resist $H_2$ reduction reactions.

The sorbent materials of the instant invention may be used in combination with a stabilizing material, which helps in the manufacturing of the sorbent media (e.g. in extrusion), and in some situations serves to prevent the sorbent media from decomposing (e.g. $Cu(OH)_2 \rightarrow CuO+H_2O$). Useful stabilizers include but are not limited to the elements Be, Mg, transition metals selected from V, Mo, Co, Ni, Cu, Zn, B, Al, Si, Pb, Sb, Bi and oxides, hydroxides hydrogen carbonates, hydrogen sulfates, hydrogen phosphates, sulfides, peroxides, halides, carboxylates, and oxy acids thereof.

The composition of the "slow" high-capacity, sorbents useful in the present invention, preferably includes a copper content of from about 15 to 80 wt %, more preferably from about 20 to 70 wt % and most preferably from about 30 to 65 wt %. In one embodiment the composition of the "slow" high-capacity, sorbent includes a copper content of 50.5 wt % copper.

In a preferred embodiment, the "fast" sorbent layer material comprises a composition selected from the following compositions in approximate weight percents:

1. copper oxide, (Cu 6%); Silver oxide, (Ag 0.1%); zinc oxide, (Zn 6.0%); Molybdenum oxide, (Mo 2.5%); triethylenediamine, (TEDA 3.5%); and activated carbon; and
2. manganese oxide, (Mn 22%); copper oxide, (Cu 23%); cobalt oxide, (Co 10%); silver oxide (Ag 3.5%); and aluminum oxide, (Al 2.6%).

The composition of the high capture rate "fast" sorbents of the present invention are preferably resistant to by-products produced during target species interaction/abatement with the "slow" sorbent layer, including but not limited to $H_2O$ and/or $CO_2$. Preferably the composition of the "fast" sorbent layer comprises at least one active component selected from the group consisting of, carbon, CuO, $Cu_2O$, MnOx, wherein x is from 1 to 2 inclusive, AgO, $Ag_2O$, CoO, $Co_3O_4$, $Cr_2O_3$, $CrO_3$, $MoO_2$, $MoO_3$, $TiO_2$, NiO, LiOH, $Ca(OH)_2$, CaO, NaOH, KOH, $Fe_2O_3$, ZnO, $Al_2O_3$, $K_2CO_3$, $KHCO_3$, $Na_2CO_3$, $NaHCO_3$, $NH_3OH$, $Sr(OH)_2$, HCOONa, BaOH, $KMnO_4$, $SiO_2$, ZnO, MgO, $Mg(OH)_2$, $Na_2O_3S_2$, triethylenediamine (TEDA) and mixtures thereof. More preferably, the composition of the "fast" sorbent layer comprises at least one component selected from the group consisting of, CuO, AgO, CoO, $Co_3O_4$, ZnO, $MnO_2$ and mixtures thereof. In addition to an active component, the composition of the "fast" sorbent layer, may further comprise a stabilizer or the active component may be impregnated into or coated onto an adsorbent substrate.

The composition of the high capture rate "fast" sorbents of the present invention may further comprise a strong base, such as KOH, which increases the abatement kinetics of specific sorbents to acid gases.

In a further embodiment, the present invention relates to a post polishing abatement system comprising a layer of "fast" sorbent material, wherein said layer is positioned downstream from a primary abatement system which may comprise any one of dry, wet, or thermal abatement systems. Preferably the composition of the "fast" sorbent layer comprises at least one component selected from the group consisting of, carbon, CuO, $Cu_2O$, MnOx, wherein x is from 1 to 2 inclusive, AgO, $Ag_2O$, CoO, $Co_3O_4$, $Cr_2O_3$, $CrO_3$, $MoO_2$, $MoO_3$, $TiO_2$, NiO, LiOH, $Ca(OH)_2$, CaO, NaOH, KOH, $Fe_2O_3$, ZnO, $Al_2O_3$, $K_2CO_3$, $KHCO_3$, $Na_2CO_3$, $NaHCO_3$, $NH_3OH$, $Sr(OH)_2$, HCOONa, BaOH, $KMnO_4$, $SiO_2$, ZnO, MgO, $Mg(OH)_2$, $Na_2O_3S_2$, triethylenediamine (TEDA) and mixtures thereof. More preferably, the composition of the "fast" sorbent layer comprises at least one component selected from the group consisting of, CuO, AgO, CoO, $Co_3O_4$, ZnO, $MnO_2$ and mixtures thereof Table 1 below shows a comparison of dry resin abatement systems with and without a downstream "that" sorbent polishing system employed. Concentration of target species constituent and linear velocity are identified in Columns 4 and 5 respectively. In all cases, the polishing layer increases the TIN capacity of the target species constituent. The instant invention provides a means by which to increase TLV capacities for particular gaseous components by as much as 100% (See Test numbers 12 and 13 below).

TABLE 1

Comparison of Various Compositions Useful in the Dual Layer System of the Instant Invention.

| Test # | Layer 1 "Slow" (Main constituent) | Polishing Layer "Fast" Main Constituents | Concentration | Linear Velocity cm/s | TLV Capacity mol/L (L/kg) |
|---|---|---|---|---|---|
| 1 | CuO/ZnO/KOH | NA | 0.8% $AsH_3$ | 4 | 1.16 (20.0) |
| 2 | CuO/ZnO/KOH | CuO, $MnO_2$ | 0.8% $AsH_3$ | 4 | 1.97 (36.4) |
| 3 | CuO/ZnO/KOH | NA | 3% $AsH_3$ | 2 | 1.89 (21.4) |
| 4 | CuO/ZnO/KOH | NA | 4% $AsH_3$ | 4 | 1.16 (20.0) |
| 5 | CuO/ZnO/KOH | NA | 2% $AsH_3$ | 4 | 1.05 (18.1) |
| 6 | CuO/ZnO/KOH | NA | 4% $AsH_3$ | 2 | 1.60 (27.8) |
| 7 | CuO/ZnO/KOH | NA | 1% $AsH_3$ | 4 | 0.85 (14.7) |
| 8 | CuO/ZnO/KOH | CuO, $MnO_2$ | 4% $AsH_3$ | 4 | 1.75 (32.3) |
| 9 | CuO/ZnO/KOH | NA | 50% $AsH_3$ | 0.5 | 4.6 (79.3) |
| 10 | CuO/ZnO/KOH | CuO, $MnO_2$, $Co_3O_4$, AgO | 50% $AsH_3$ | 0.5 | 6.0 (110.7) |
| 11 | CuO/ZnO/KOH | NA | 1% $AsH_3$ | 1 | 1.94 (33.2) |
| 12 | $CuCO_3 \cdot Cu(OH)_2$ | NA | 4% $AsH_3$ | 4 | 1.00 (26.4) |
| 13 | $CuCO_3 \cdot Cu(OH)_2$ | Activated carbon w/ metals | 4% $AsH_3$ | 4 | 2.04 (56.7) |
| 14 | $CuCO_3 \cdot Cu(OH)_2$ | Activated Carbon w/ metals | 50% $AsH_3$ | 0.5 | 5.23 (145.4) |

TABLE 1-continued

Comparison of Various Compositions Useful in the Dual Layer System of the Instant Invention.

| Test # | Layer 1 "Slow" (Main constituent) | Polishing Layer "Fast" Main Constituents | Concentration | Linear Velocity cm/s | TLV Capacity mol/L (L/kg) |
|---|---|---|---|---|---|
| 15 | $CuCO_3.Cu(OH)_2$ | Ni | 4% $AsH_3$ | 4 | 0.94 (26.2) |
| 16 | $CuCO_3.Cu(OH)_2$ | CuO, $MnO_2$, $Co_3O_4$, AgO | 1% $AsH_3$ | 1 | 3.67 (102) |
| 17 | $CuCO_3.Cu(OH)_2$ | Activated Carbon w/ metals | 4% ($PH_3$) | 1 | 3.39 (94.2) |
| 18 | $CuCO_3.Cu(OH)_2$ | Activated Carbon w/ metals and TEDA | 4% $AsH_3$ | 4 | 2.49 (69.2) |
| 19 | $CuCO_3.Cu(OH)_2$ | NA | 2% $SiH_4$ | 1 | 0.87 (22.9) |
| 20 | $CuCO_3.Cu(OH)_2$ | Activated Carbon w/ metals and TEDA | 2% $SiH_4$ | 1 | 1.17 (34.9) |
| 21 | $CuCO_3.Cu(OH)_2$ | Activated Carbon w/ metals and TEDA | 1% $SiH_4$ | 1 | 2.22 (61.4) |

It will be appreciated that the optimal amount of polish will be based upon the ratio of the mass transfer zone to the overall length of the sorbent beds, (MTZ/LOB). That is, the relative length of the mass transfer zone within the main resin bed will dictate the optimal amount of polish to use.

Figure 3:
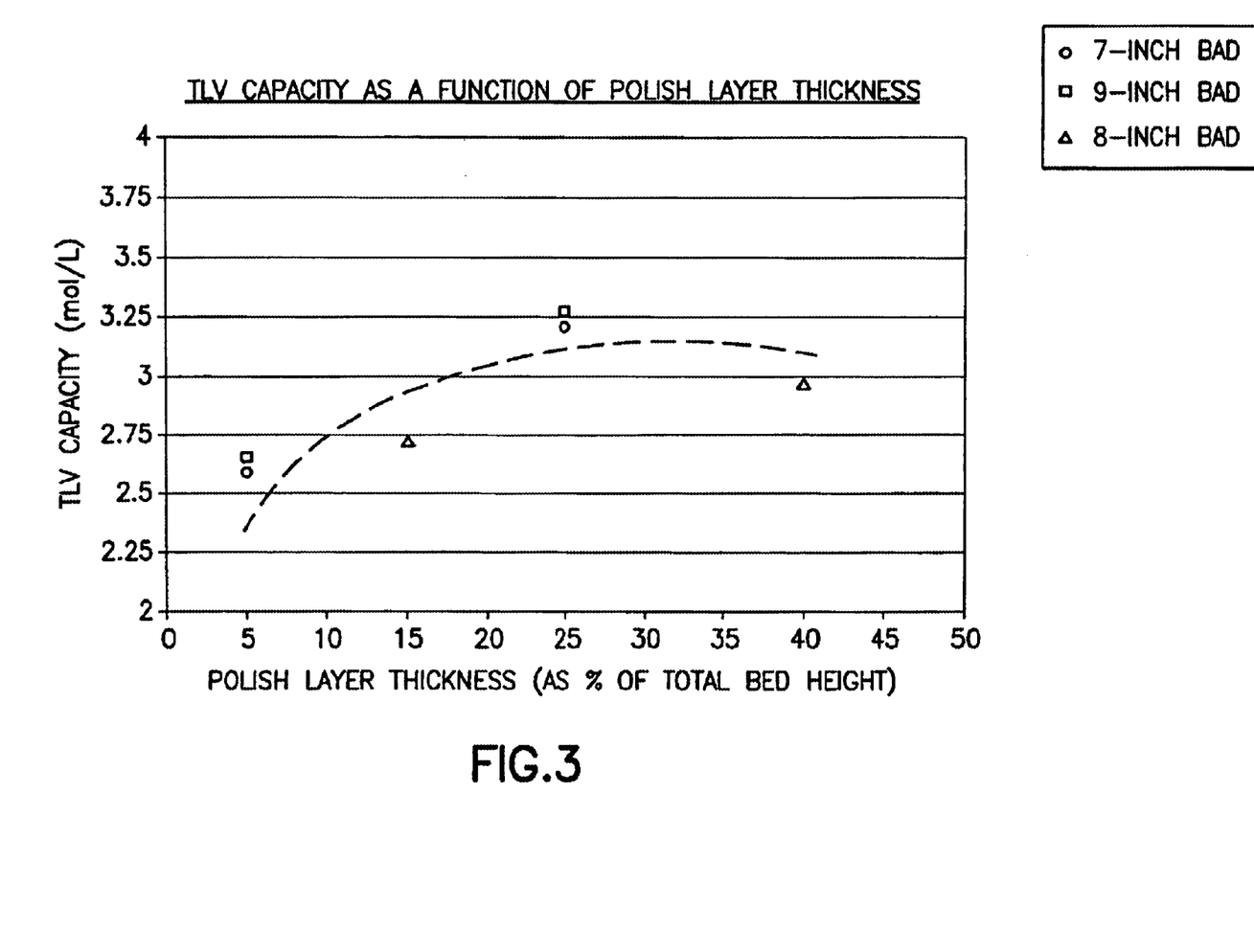
FIG. 3 is a schematic representation of a chemical vapor deposition scrubber system according to one embodiment of the invention.

FIG. 3 shows a plot of TLV capacity as a function of "fast" sorbent polishing layer thickness for an abatement system employing basic copper carbonate, $CuCO_3.Cu(OH)_2$ as the main bed "slow" sorbent system. As shown, the optimal polishing layer thickness is approximately 25–30% of the total bed length, for a 7 to 9 inches total bed height. As the bed height increases, the optimal polish amount decreases as a fraction of total bed volume.

In a further embodiment the present invention comprises a layered dry resin sorbent system for abatement of an acid gas, hydride gas and/or by-product thereof, from a Group III-V semiconductor process of a semiconductor manufacturing facility, said layered sorbent system comprising, a first layer of "slow" sorbent material having a composition consisting essentially of basic copper carbonate and, a second layer of "fast" sorbent material having a composition consisting essentially of copper oxide, (Cu 6%); Silver oxide, (Ag 0.1%); zinc oxide, (Zn 6.0%); Molybdenum oxide, (Mo 2.5%); triethylenediamine, (TEDA 3.5%); and activated carbon, said sorbent system having a TLV sorbent capacity for arsine at 1 cm/sec of 3.67 moles/liter resin or 102 liters $AsH_3$/kg resin.

In a further embodiment the present invention relates to a process for reducing the concentration of at least one hydride gas, acid gas or by-product species from a Group III-V semiconductor process effluent stream containing same, said method comprising:
  contacting said semiconductor process effluent with a first sorbent layer composition so as to retain at least a portion of the gaseous species therein; and
  contacting said process effluent with a second layer sorbent composition, so as to retain a second portion of the gaseous species therein,
  wherein said first sorbent layer comprises a material having a high sorptive capacity for said gaseous species and said second sorbent layer material comprises a material having a high capture rate sorptive affinity for the gaseous species. Preferably, the process enables a system having a capacity to retain a particular gaseous species greater than the sum of the capacities of the individual sorbent layers.

More specifically, the present invention relates to a method of decreasing the concentration of at least one hydride or acid gas species from a semiconductor manufacturing process effluent gas stream comprising same, by contacting the at least one gaseous component with a first solid phase sorbent material comprising at least one of copper oxide, copper hydroxide and basic copper carbonate so as to produce an effluent gas stream having a reduced concentration of gaseous species; and contacting said effluent gas stream having a reduced concentration of gaseous species with a second solid phase sorbent material comprising at least copper oxide, so as to produce an effluent gas stream having a concentration of gaseous species that is less than the TLV for the at least one hydride or acid gas species (e.g. 50 ppb for arsine).

In a further embodiment the present invention relates to a high capacity system for Group III-V process abatement management comprising dual canisters, wherein one canister is online and one is offline and available for auto-switching when canister one reaches a predetermined capacity, said system comprising a layered dry resin sorbent system for abatement of an acid gas, hydride gas and/or by-product thereof, from a Group III-V semiconductor process of a semiconductor manufacturing facility, said layered sorbent system comprising, a first layer of "slow" sorbent material and, a second layer of "fast" sorbent material.

The present invention provides for multi-tool effluent abatement of Group III-V processes, wherein from one to four process tools are combined into a single abatement system for removal of gaseous Group III-V species from a Group III-V semiconductor process effluent stream.

Figure 4:
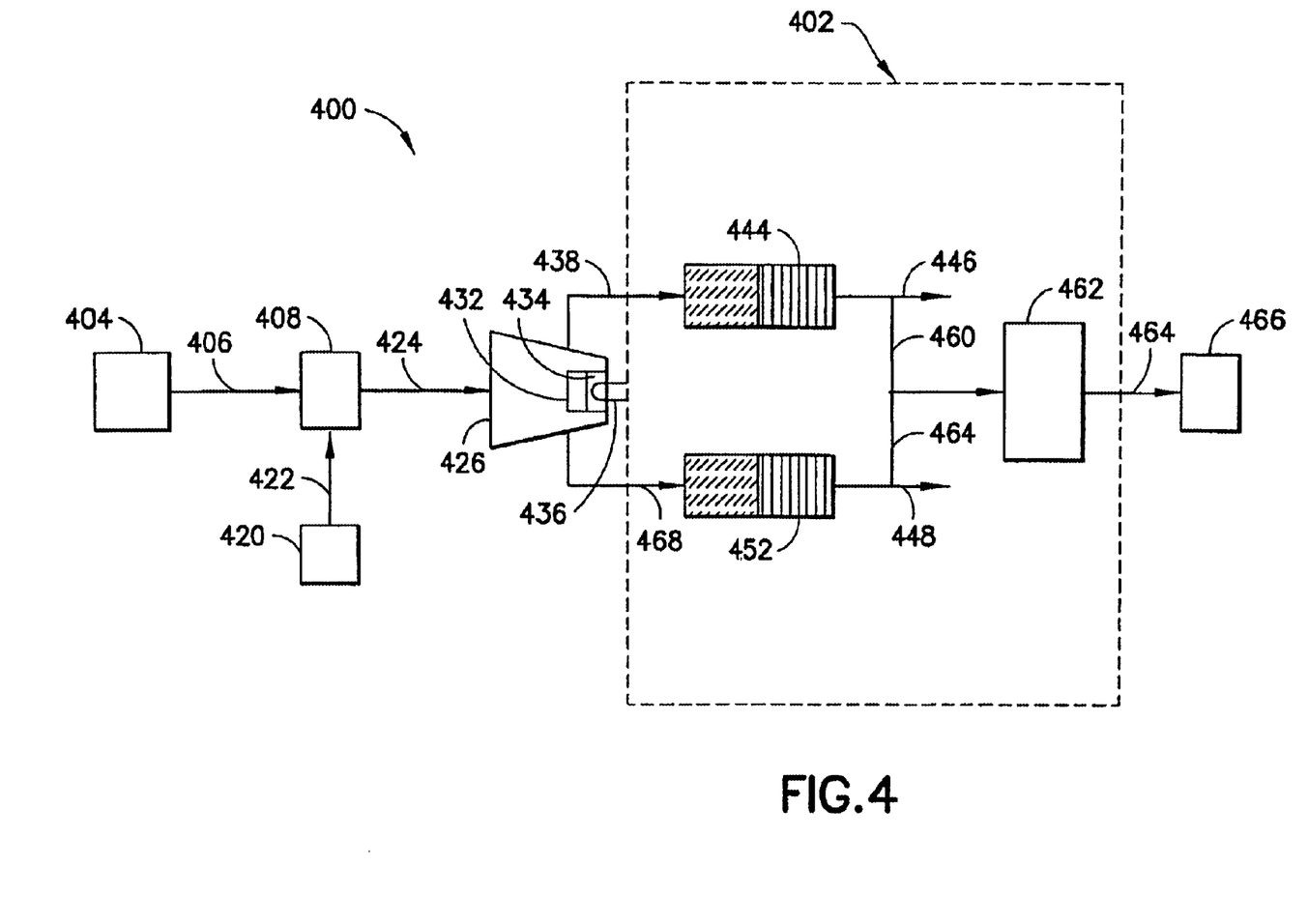
FIG. 4 is a schematic representation of a thin film fabrication facility including an effluent abatement system according to one embodiment of the present invention.

For ease of reference in the ensuing discussion, a generalized description is set out below of FIG. 4, showing a schematic representation of a thin film fabrication facility 400 including an effluent abatement system 402 according to one embodiment of the present invention.

As used herein, the sorbent compositions herein disclosed are intended to be broadly construed, and may alternatively comprise, consist, or consist essentially of the specific stated components or ingredients hereafter specifically identified for such compositions. It will also be understood that such compositions may if desired be devoid of components or ingredients not herein expressly identified.

The system accommodates the collection of un-utilized acid and hydride gases and their by-products in an effluent gas stream by irreversible chemisorption, by contacting the effluent gas stream with a chemisorbent composition, and the continuous monitoring of the chemisorbent scrubber composition to determine the approach to exhaustion of the capacity of the chemisorbent scrubber composition to remove undesired components of the effluent gas stream.

The chemical vapor deposition (CVD) system includes a feed source 404 of source gas for chemical vapor deposition operation, which may comprise a source gas storage and dispensing vessel containing a deposition gas such as $AsH_3$ (not shown). From the vessel, gas source flows in line 406 to the gas dispensing manifold assembly 408 including line 424, through which the dispensed gas is flowed to the chemical vapor deposition apparatus 426. Concurrently, if desired, a carrier gas, such as argon, helium, hydrogen, etc., is flowed from the carrier gas source 420 in line 422 to the dispensing manifold assembly 408. The carrier gas thus entrains the gas source and forms a gas source mixture.

The gas source mixture flows in line 424 from dispensing manifold assembly 408 to the CVD reactor 426, being dispersed in the interior volume of the reactor. This gaseous source mixture thereby is directed to and impinges on a wafer substrate 432 positioned on susceptor 434 heated by heating element 436. The wafer substrate is maintained at a sufficiently elevated temperature to cause decomposition of the precursor vapor mixture and chemical vapor deposition of the desired component of the precursor on the surface of the wafer substrate.

An effluent comprising waste gases and decomposition by-products is discharged from the reactor 426 and flows in line 438 to the effluent abatement system 402, comprising a layered sorbent system 444, of sorbent materials which may include physical adsorbent(s) and/or chemisorbent(s), for removal therein of contaminant(s) and discharge of a purified effluent gas stream in line 446 to downstream processing or final disposition of same.

Effluent gas from the chemical vapor deposition reactor 426 may also be discharged into a second line 468 and flowed to the abatement system 402 comprising a second layered sorbent system 452, for removal of undesired gas stream components therein, to yield a purified gas stream which is discharged from the abatement system in line 448 and passed to further treatment or other disposition steps.

The abatement system 402 may be provided in duplicate as shown, with one of the systems being a backup scrubbing and/or by-pass unit, and with the lines 438 and 468 containing suitable valving and instrumentation to accommodate such redundancy function, so that one of the beds is initially on-stream and actively scrubbing the effluent gas stream from the chemical vapor deposition reactor 426, while the other is in stand-by mode.

At the outlet end of the sorbent beds 444 and 452, effluent tap lines 460 and 464, which conveys a side-stream of the effluent gas to an endpoint detector 462, as hereinafter more fully described.

The endpoint detector 462, upon detecting the breakthrough or incipient breakthrough of one or more species in the effluent being monitored, generates a control signal that is transmitted in transmission line 464 to the central processing unit (CPU) 466, which may be operatively arranged to effect a corresponding action in the facility.

For example, the system may be arranged so that on incipient breakthrough detection by the endpoint detector, the effluent flow is diverted to a second sorbent bed, or to a holding (surge) vessel for retention until the regeneration of the sorbent bed has been carried out.

Alternatively, or additionally, such endpoint breakthrough detection may be employed to initiate a regeneration sequence, to renew the exhausted sorbent bed for subsequent on-stream operation.

Alternatively, the two scrubber beds 444 and 452 may be concurrently operated, and may each process different effluent streams generated in the operation of the chemical vapor deposition apparatus. For example, one of such abatement systems may process a main effluent gas stream from the chemical vapor deposition apparatus, while the other may for example process a minor effluent stream deriving from pump leakage gas in the effluent treatment system.

The abatement system may be deployed as a separate and distinct apparatus component of the overall system, in relation to the chemical vapor deposition apparatus, and the feed source of the chemical vapor deposition apparatus.

By the system shown in FIG. 4, the process gases leaving the chemical vapor deposition apparatus (e.g., the chemical vapor deposition chamber), are exhausted to vessel(s) containing at least two dry scrubbing sorbent compositions in discrete layers, specific to the chemical vapor deposition gases to be abated in the effluent gas stream. The dry scrubbing compositions remove the waste gases from effluent, (e.g., the chemical vapor deposition chamber exhaust), by chemisorption, irreversibly bonding the waste gas species to the scrubbing medium to maximum operator safety and environmental acceptability of the finally discharged process effluent after its scrubbing treatment.

The features and layout of the semiconductor manufacturing facility shown in FIG. 4 are illustrative in character only, and any other suitable features, arrangements and operation may be advantageously employed.

The dry scrubbing sorbent compositions may therefore be provided in canisters, which are deployed in close proximity to treat the effluent gas stream(s) produced by the process and yield an environmentally acceptable discharged stream. Such canisters can be readily changed out by decoupling same from connecting piping and valving employing conventional connector devices, and replacing the canister of spent sorbent medium with a corresponding canister of fresh medium.

The amount of scrubbing medium used in such disposable canisters for waste gas treatment will be determined by the available dead volume within a particular process tool. With respect to chemical vapor deposition and/or ion implantation, when the canisters are interiorly positioned in the system housing or exteriorly positioned in close proximity to the system housing, the amount of scrubbing medium used will be determined by the deliverable capacity of the feed source of doping gas for the particular system. The feed source volume may be desirably matched to the system throughput, so that the capacity of the source gas vessel does not exceed the removal capacity of the waste gas abatement canister(s) deployed in the system.

Although illustratively shown as comprising a two canister unit, the abatement system may in fact be a multiple bed arrangement comprising multiple sorbent beds variously connected in series, layers, bypass and/or parallel (manifolded) arrangements.

While the invention has been described herein with reference to specific features and illustrative embodiments, it will be recognized that the utility of the invention is not thus limited, but rather extends to and encompasses other features, modifications and alternative embodiments as will readily suggest themselves to those of ordinary skill in the art based on the disclosure and illustrative teachings herein. The claims that follow are therefore to be construed and interpreted as including all such features, modifications and alternative embodiments within their spirit and scope.

We claim:

1. A process for reducing a concentration of at least one toxic gas component from a semiconductor process effluent stream containing same, said method comprising:

contacting said semiconductor process effluent with a first sorbent layer composition so as to retain at least a portion of the toxic gas component therein; and contacting said process effluent with a second layer sorbent composition, so as to retain a second portion of the toxic gas component therein, wherein said first sorbent layer comprises a material having a high sorptive capacity for said toxic component and said second sorbent layer material comprises a material having a high capture rate sorptive affinity for the toxic component.

2. The process according to claim 1, wherein said semiconductor process is selected from the group consisting of: ion implantation, metal organic chemical vapor deposition and plasma enhanced chemical vapor deposition.

3. The process according to claim 1, wherein said toxic gas component is selected from the group consisting of: $AsH_3$, $PH_3$, $SbH_3$, $BiH_3$, $GeH_4$, $SiH_4$, $NH_3$, HF, HCl, HBr, $Cl_2$, $F_2$, $Br_2$, $BCl_3$, $BF_3$, $AsCl_3$, $PCl_3$, $PF_3$, $GeF_4$, $AsF_5$, $WF_6$, $SiF_4$, $SiBr_4$, $COF_3$, $OF_2$, $SO_2F_2$, $SOF_2$, WOF4, ClF3(hfac)In$(CH_3)_2$H$_2$As(t-butyl), $H_2$P(t-butyl), $Br_2$Sb$(CH_3)$, $SiHCl_3$, and $SiH_2Cl_2$.

4. The process according to claim 1, wherein said toxic gas component is selected from the group consisting of: $AsH_5$, $PH_3$, $SbH_3$, $BiH_3$, $GeH_4$, $SiH_4$, $NH_3$, $H_2$As(t-butyl), $H_2$P(t-butyl), $Br_2$Sb$(CH_3)$, $SiHCl_3$, and $SiH_2C_2$.

5. The apparatus according to claim 1, wherein said toxic gas component is selected from the group consisting of: HF, MCl, HBr, $Cl_2$, $F_2$, $Br_2$, $BCl_3$, $BF_3$, $AsCl_3$, $PCl_3$, $PF_3$, $GeF_4$, $AsF_5$, $WF_6$, $SiF_4$, $SiBr_4$, $COF_2$, $OF_2$, $SO_2$, $SO_2F_2$, $SOF_2$, WOF4, ClF3 (hfac)In$(CH_3)_2$ and $Br_2$Sb$(CH_3)$).

6. The process according to claim 1, having an overall sorptive capacity greater than the sum of the capacities of said first and second sorbent layer.

7. The process according to claim 1, wherein said high capacity sorbent material comprises at least one of: copper oxide, copper hydroxide copper carbonate, and basic copper carbonate.

8. The process according to claim 1, wherein said high capture rate sorbent material comprises at least one component selected from the group consisting of, carbon, CuO, $Cu_2O$, $MnO_x$, wherein x is from 1 to 2 inclusive, AgO, $Ag_2O$, CoO, $Co_3,O_4$, $Cr_3,O_3$, $CrO_3$, $MoO_2$, $MoO_3$, $TiO_2$, NiO, LiOH, Ca(OH)$_2$, CaO, NaOH, KOH, $Fe_2O_3$, ZnO, $Al_2O_3$, $K_2CO_3$, $KHCO_3$, $Na_2CO_3$, $NaHCO_3$, $NH_4OH$, Sr(OH)$_2$, HCOONa, BaOH, $KMnO_4$, $SiO_2$, ZnO, MgO, Mg(OH)$_2$, $Na_2,O_3,S_2$, triethylenediamine (TEDA) and mixtures thereof.

9. The process according to claim 1, wherein said high capture rate sorbent material further comprises a stabilizer selected from the group consisting of: Be, Mg, V, Mo, Co, Ni, Cu, Zn, B, Al, Si, Pb, Sb, Bi, oxides, hydroxides hydrogen carbonates, hydrogen sulfates, hydrogen phosphates, sulfides, peroxides, halides, carboxylates, and oxy acids thereof.

10. The process according to claim 1, wherein said high capture rate sorbent material comprises at least one component selected from the group consisting of: carbon, NaOH, KOH, LiOH, Ca(OH)$_2$, and $NH_4OH$.

11. The process according to claim 1, wherein said toxic gas component is arsine.

12. The process according to claim 11, wherein said concentration of arsine is reduced to less than 50 ppb.

13. An apparatus for abatement of at least one toxic gas component or by-product thereof, from an effluent stream deriving from a semiconductor manufacturing process, such apparatus comprising:

a first sorbent bed material having a high capacity sorbent affinity for said at least one toxic gas component;

a second and discreet sorbent bed material having a high capture rate for said at least one toxic gas component; and a flow path joining the process in gas flow communication with the sorbent bed materials such that the effluent stream contacts the first sorbent bed material then the second sorbent bed material to at least partially remove the at least one toxic gas component from the effluent stream.

14. The apparatus according to claim 13, wherein said semiconductor manufacturing process is related to a Group III-V process.

15. The apparatus according to claim 13, wherein said semiconductor manufacturing process is selected from the group consisting of: ion implantation, metal organic chemical vapor deposition and plasma enhanced chemical vapor deposition.

16. The apparatus according to claim 13, wherein said toxic gas component is selected from the group consisting of: $AsH_3$, $PH_3$, $SbH_3$, $BiH_3$, $GeH_4$, $SiH_4$, $NH_3$, HF, HCl, HBr, $Cl_2$, $F_2$, $Br_2$, $BCl_3$, $BF_3$, $AsCl_3$, $PCl_3$,$PF_3$, $GeF_4$, $AsF_3$, $WF_6$, $SiF_4$, $SiBr_4$, $COF_2$, $OF_3$, $SO_3F_3$, $SOF_2$, WOF4, ClF3 (hfac)In$(CH_3,)_2$H$_2$As(t-butyl), $H_2$P(t-butyl), $Br_2$Sb$(CH_3)$, $SiHCl_3$, and $SiH_2Cl_2$.

17. The apparatus according to claim 13, wherein said toxic gas component is selected from the group consisting of: $AsH_3$, $PH_3$, $SbH_3$, $BiH_3$, $GeH_4$, $SiH_4$, $NH_3$, $H_1$As(t-butyl), $H_2$P(t-butyl), $Br_2$Sb$(CH_3)$, $SiHCl_3$, and $SiH_2$, $Cl_2$.

18. The apparatus according to claim 13, wherein said toxic gas component is selected from the group consisting of: HF, HCl, HBr, $Cl_2$, $F_2$, $Br_2$, $BCl_3$, $BF_3$, $AsCl_3$, $PCl_3$, $PF_3$, $GeF_4$, $AsF_5$, $WF_6$, $SiF_4$, $SiBr_4$, $COF_2$, $OF_2$, $SO_2$, $SO_2F_2$, $SOF_2$, WOF4, ClF 3(hfac)In$(CH_3)_2$ and $Br_2$Sb$(CH_3)$.

19. An apparatus for abatement of at least one acid gas, hydride gas or by-product thereof, from an effluent stream deriving from a semiconductor manufacturing process, such apparatus comprising:

a first sorbent bed material having a high capacity sorbent affinity for said at least one acid gas, hydride gas or by-product thereof;

a second and discreet sorbent bed material having a high capture rate sorbent affinity for said at least one acid gas, hydride gas or by-product thereof; and a flow path joining the process in gas flow communication with the sorbent bed materials such that the effluent stream contacts the first sorbent bed material then the second sorbent bed material to at least partially remove the at least one acid gas, hydride gas or by-product thereof from the effluent stream.

20. A layered dry resin sorbent system for abatement of an acid gas, hydride gas or by-product thereof, comprising;

a first sorbent bed material having a high capacity sorbent affinity for said acid gas, hydride gas or by-product thereof;

a second and discreet sorbent bed material having a high capture rate sorbent affinity for said acid gas, hydride gas or by-product thereof; and a flow path joining the process in gas flow communication with the sorbent bed materials such that the effluent stream contacts the first sorbent bed material then the second sorbent bed material to at least partially remove the at least one acid gas, hydride gas or by-product thereof from the effluent stream.

21. The layered dry resin sorbent system according to claim 20, wherein said hydride gas is selected from the group consisting of: $AsH_3$, $PH_3$, $SbH_3$, $BiH_3$, $GeH_4$, $SiH_4$, $NH_3$, $H_2As(t$-butyl$)$, $H_2P(t$-butyl$)$, $Br_2Sb(CH_3)$, $SiHCl_3$, and $SiH_2Cl_2$.

22. The layered dry resin sorbent system according to claim 20, wherein said acid gas is selected from the group consisting of: HF, HCl, HBr, $Cl_2$, $F_2$, $Br_2$, $BCl_3$, $BF_3$, $AsCl_3$, $PCl_3$, $PF_3$, $GeF_4$, $AsF_5$, $WF_6$, $SiF_4$, $SiBr_4$, $COF_2$, $OF_2$, $SO_2$, $SO_2F_2$, $SOF_2$, $WOF_4$, $ClF_3$, (hfac)$In(CH_3)_2$ and $Br_2Sb(CH_3)$.

23. The layered dry resin sorbent system according to claim 20, wherein said first and second sorbent beds differ by the temperature at which reductive hydrogenation becomes auto-catalystic.

24. The layered dry resin sorbent system according to claim 20, wherein said second sorbent bed has a capture rate that is higher than said first sorbent bed.

25. The layered dry resin sorbent system according to claim 20, wherein said sorbent bed material comprises an article selected from the group consisting of: beads, spheres, rings, toroidal shapes, irregular shapes, rods, cylinders, flakes, films, cubes, polygonal geometric shapes, sheets, fibers, coils, helices, meshes, sintered porous masses, granules, pellets, tablets, powders, particulates, extrudates, cloth form materials, web form materials, honeycomb matrix monolith, matrix monolith, composites (of the sorbent article with other components), or comminuted or crushed forms of the foregoing conformations.

26. The layered dry resin sorbent system according to claim 20, wherein said sorbent bed material comprises, particulates having a size range of from about 0.1 mm to 1.5 cm.

27. The layered dry resin sorbent system according to claim 20, wherein said sorbent bed material is selected from the group consisting of physisorbent and chemisorbent.

28. The layered dry resin sorbent system according to claim 20, wherein said first and second beds are housed in a single containment system.

29. The layered dry resin sorbent system according to claim 20, wherein said first and second beds are housed in separate containment systems.

30. The layered dry resin sorbent system according to claim 20, wherein said first and second sorbent bed materials comprise a blended mixture of sorbent materials.

31. The layered dry resin sorbent system according to claim 20, having a volumetric ratio of first sorbent bed to second sorbent bed from about 1:2 to 1:1.

32. The layered dry resin sorbent system according to claim 20, wherein said high capacity sorbent materials comprises an oxidized form of copper.

33. The layered dry resin sorbent system according to claim 20, wherein said high capacity sorbent material is selected from the group consisting of, copper hydroxide, $Cu(OH_2)$; copper oxide, CuO; copper carbonate, $CuCO_3$, basic copper carbonate, $CuCO_3.Cu(OH)_2$, and combinations thereof.

34. The layered dry resin sorbent system according to claim 20, wherein said high capacity sorbent material comprises $CuCO_3.Cu(OH)_2$.

35. The layered dry resin sorbent system according to claim 20, wherein said high capacity sorbent material resists H2 reduction reaction up to temperatures in excess of 180° C.

36. The layered dry resin sorbent system according to claim 20, wherein said high capacity sorbent material comprises from about 20 to 100 wt % active ingredient.

37. The layered dry resin sorbent system according to claim 20, wherein said high capture rate sorbent material comprises at least one component selected from the group consisting or, carbon, CuO, $Cu_2O$, $MnO_x$, wherein x is from 1 to 2 inclusive, AgO, $Ag_3O$, CoO, $Co_3O_4$, $Cr_3O_3$, $CrO_3$, $MoO_2$, $MoO_3$, $TiO_2$, NiO, LiOH, $Ca(OH)_3$, CaO, NaOH, KOH, $Fe_2O_3$, ZnO, $Al_2O_3$, $K_3CO_3$, $KHCO_3$, $Na_2CO_3$, $NaHCO_3$, $NH_4OH$, $Sr(OH)_3$, HCOONa, BaOH, $KMnO_4$, $SiO_3$, ZnO, MgO, $Mg(OH)_2$, $Na_2O_3$, $S_2$, triethylenediamine (TEDA) and mixtures thereof.

38. The layered dry resin sorbent system according to claim 37, wherein said high capture rate sorbent material further comprises a stabilizer selected from the group consisting of: Bc, Mg, V, Mo, Co, Ni, Cu, Zn, B, Al, Si, Pb, Sb, Bi, oxides, hydroxides hydrogen carbonates, hydrogen sulfates, hydrogen phosphates, sulfides, peroxides, halides, carboxylates, and oxy acids thereof.

39. The layered dry resin sorbent system according to claim 20, wherein said high capture rate sorbent material comprises at least one component selected from the group consisting of: carbon, NaOH, KOH, LiOH, $Ca(OH)_2$ and $NH_4OH$.

40. The layered dry resin sorbent system according to claim 20, wherein said high capture rate sorbent material comprises a composition selected from the group consisting of:

1. copper oxide, (Cu 6%); Silver oxide, (Ag 0.1%); zinc oxide, (Zn 6.0%); Molybdenum oxide, (Mo 2.5%); triethylenediamine, (TEDA 3.5%); and activated carbon; and 2. manganese oxide, (Mn 22%); copper oxide, (Cu 23%); cobalt oxide, (Co 10%); silver oxide (Ag 3.5%); and aluminum oxide. (Al 2.6%).

41. The layered dry resin sorbent system according to claim 40, having a TLV sorbent capacity for arsine at 1 cm/sec of 3.67 moles/liter resin or 102 liters $AsH_3$/kg resin.

42. The layered dry resin sorbent system according to claim 20, wherein said high capture rate sorbent material comprises: copper oxide, (Cu 6%); Silver oxide, (Ag 0.1%); zinc oxide, (Zn 6.0%); Molybdenum oxide, (Mo 2.5%); triethylenediamine, (TEDA 3.5%); and activated carbon, said sorbent system having a TLV sorbent capacity for arsine at 1 cm/sec of 3.67 moles/liter resin or 102 liter $AsH_3$/kg resin.

43. The layered dry resin sorbent system according to claim 20, having a TLV sorbent capacity for arsine at 1 cm/sec of 3.67 moles/liter resin or 102 liters $AsH_3$/kg resin.

44. The layered dry resin sorbent system according to claim 20, further comprising means for monitoring the sorbent materials for exhaustion.

* * * * *